US007107545B2

(12) United States Patent
Adleman (10) Patent No.: US 7,107,545 B2
(45) Date of Patent: Sep. 12, 2006

(54) SYSTEM AND METHOD FOR PROVIDING A GRAPHICAL USER INTERFACE DISPLAY WITH A CONSPICUOUS IMAGE ELEMENT

(75) Inventor: George Adleman, Arlington, MA (US)

(73) Assignee: Draeger Medical Systems, Inc., Andover, MA (US)

( * ) Notice: Subject to any disclaimer, the term of this patent is extended or adjusted under 35 U.S.C. 154(b) by 522 days.

(21) Appl. No.: 10/093,660

(22) Filed: Mar. 8, 2002

(65) Prior Publication Data

US 2003/0146935 A1 Aug. 7, 2003

Related U.S. Application Data

(60) Provisional application No. 60/354,137, filed on Feb. 4, 2002.

(51) Int. Cl.
*G06F 3/00* (2006.01)
(52) U.S. Cl. .................. 715/767; 715/802; 715/821; 715/822; 715/823; 715/859; 715/860; 715/768
(58) Field of Classification Search ............... 715/767, 715/802, 821, 822, 823, 859, 860, 768
See application file for complete search history.

(56) References Cited

U.S. PATENT DOCUMENTS

| 4,710,763 | A |   | 12/1987 | Franke et al. ............... 340/723 |
|---|---|---|---|---|
| 4,847,604 | A |   | 7/1989 | Doyle ...................... 340/706 |
| 4,899,136 | A |   | 2/1990 | Beard et al. ............... 340/706 |
| 5,072,412 | A |   | 12/1991 | Henderson, Jr. et al. .... 395/159 |
| 5,469,540 | A |   | 11/1995 | Powers, III et al. ........ 395/158 |
| 5,488,685 | A |   | 1/1996 | Palmer et al. ............. 395/157 |
| 5,550,969 | A |   | 8/1996 | Torres et al. .............. 395/159 |
| 5,565,888 | A | * | 10/1996 | Selker ...................... 345/823 |
| 5,706,454 | A | * | 1/1998 | MacPhail .................. 345/822 |
| 5,721,851 | A |   | 2/1998 | Cline et al. ................ 395/349 |
| 5,737,553 | A |   | 4/1998 | Bartok ..................... 395/339 |
| 5,852,440 | A | * | 12/1998 | Grossman et al. .......... 345/811 |
| 5,859,638 | A |   | 1/1999 | Coleman et al. ........... 345/341 |
| 5,920,313 | A | * | 7/1999 | Diedrichsen et al. ....... 345/767 |
| 5,940,078 | A | * | 8/1999 | Nagarajayya et al. ....... 345/859 |
| 5,956,035 | A | * | 9/1999 | Sciammarella et al. ..... 345/815 |
| 5,959,624 | A |   | 9/1999 | Johnston, Jr. et al. ...... 345/334 |
| 6,002,400 | A |   | 12/1999 | Loring et al. .............. 345/348 |

(Continued)

FOREIGN PATENT DOCUMENTS

EP  0 417 883 A2  3/1991

(Continued)

OTHER PUBLICATIONS

A. Triesman, "Preattentive Processing in Vision," 1985, Computer Vision, Graphics and Image Processing 31, pp. 156-177.

(Continued)

*Primary Examiner*—Tadesse Hailu
*Assistant Examiner*—Michael Roswell
(74) *Attorney, Agent, or Firm*—Jack Schwartz & Associates (57) ABSTRACT

A system and a method are described for providing a graphical user interface display with a conspicuous image element. In one example, a particular image element is first identified. Predetermined rules are then applied to ensure that the particular image element in a first window in a displayable image has a unique user visible display attribute absent from other image elements in the first window. Predetermined rules are also applied to ensure that the unique display attribute is absent from other image elements in any other window concurrently displayed in the displayed image. The particular image element is then enabled to be responsive to user selection.

23 Claims, 5 Drawing Sheets

U.S. PATENT DOCUMENTS 6,108,714 A 8/2000 Kumagai et al. ............ 709/310
6,252,596 B1 * 6/2001 Garland ...................... 345/810
6,271,840 B1 8/2001 Finseth et al. .............. 345/349

FOREIGN PATENT DOCUMENTS

WO     WO 02/03187 A2    1/2002

OTHER PUBLICATIONS

Healy, "Preattentive Processing in Visualization," on or before Feb. 15, 2000, as appeared at http://www.csc.ncsu.edu/faculty/healey/PP/PP.html.

* cited by examiner

SYSTEM AND METHOD FOR PROVIDING A GRAPHICAL USER INTERFACE DISPLAY WITH A CONSPICUOUS IMAGE ELEMENT

CROSS REFERENCE TO RELATED APPLICATION

This application claims the benefit of a provisional U.S. application, U.S. Ser. No. 60/354,137 by G. Adleman, filed Feb. 4, 2002.

FIELD OF THE INVENTION

This invention generally relates to a computer graphical display, and more particularly, to a system and method of displaying an element so that an observer can perceive it quickly.

BACKGROUND OF THE INVENTION

Figure 1:
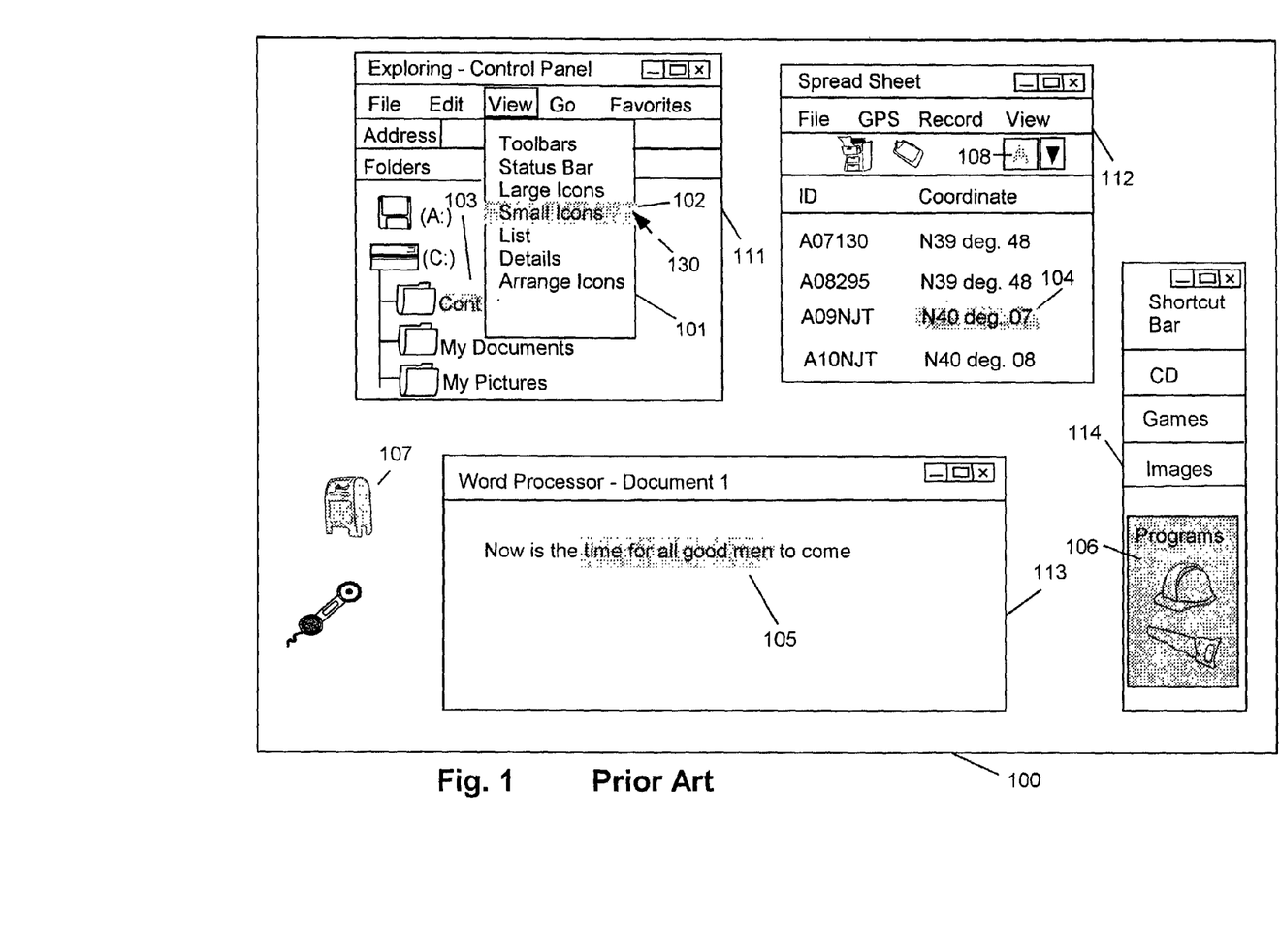
FIG. 1 illustrates a prior user interface for a computer system.

User interfaces for an embedded or a proprietary computer system (e.g., a patient monitor interface for medical use), or a non-embedded or non-proprietary system (e.g., a windows browser), often have a user interface focus element. FIG. 1 shows, for example, a user interface graphical display 100 similar to that of a well-known Microsoft Windows® operating system. Display 100 is shown having a currently focused icon such as "Small Icons" 102 command selection in the "View" command pop down list 101. As a user moves a cursor 130 up and down list 101, an item in the list 101 that is pointed to by cursor 130 will be highlighted. For example, the currently focused icon 102 is typically highlighted or made conspicous in some way by changing its attribute, such as, for example, by inversing the text, making it a different color or adding an outline box, etc., to indicate that the element is enabled to be acted upon.

In the example of FIG. 1, highlight of icon 102 is shown as, for example, having a different background color, which is represented by a darkened background shading in the black and white rendering of FIG. 1. The highlighted icon 102 may then be acted on by a further user confirmation input (e.g. via a mouse click or enter key depression).

In addition, when searching on the world wide web, a search engine site may automatically highlight a word that a user has entered to make a search, when a found web page matching the search word is being displayed. This would allow a user to easily scroll through the found web page to better locate the portion of interest on the web page.

SUMMARY OF THE INVENTION

The present inventor recognizes that a highlighted or an enabled element such as element 102 shown in FIG. 1 is not always obvious to a user. This is especially so when the method of highlighting a currently enabled icon is not unique to all other elements on a display screen. That is, a display attribute being used to highlight an element may already be in use by another element in the same window or display.

This problem is made worse in today's computing environment in which multiple applications are opened and displayed in various windows on the same display, as shown for example, in FIG. 1. This problem also occurs if an element was highlighted by a prior user or in a prior application and/or window. In any case, finding an enabled element may take considerable effort and may involve methodically and visually scanning the entire screen.

The present inventor also recognizes that a visual presentation with a distinctly unique element on that presentation can be perceived more quickly by an observer. Research on visual search done by Treisman and others (see, e.g., *Pre-attentive Processing in Vision,* Computer Vision, Graphics, and Image Processing 31, 156–177 by A. Triesman; and *Guided Search 2.0: A Revised Model of Visual Search,* Psychonomic Bulletin & Review 1, 2, 202–238 by J. M. Wolfe) suggests that an observer can process an entire image in parallel when a single, unique element is being searched for. It is also found that search time goes up dramatically if even a single other element of the same visual type is present. None of the research, however, applies these principles practically to solve the problem identified herein.

Therefore, the present inventor reconginzes that it is desirable to have a solution which enforces a unique appearance of an enabled or focused item, for example, in a window or on a whole display screen. In one exemplary embodiment, a system and a method are described for providing a graphical user interface display with a conspicuous image element. A particular image element is first identified. Predetermined rules are then applied to ensure that the particular image element in a first window in a displayable image has a unique user visible display attribute absent from other image elements in the first window. Predetermined rules are also applied to ensure that the unique display attribute is absent from other image elements in any other window concurrently displayed in the displayed image. The particular image element is then enabled to be responsive to user selection.

According to another aspect of the present invention, another exemplary system and method for providing a display screen are also described. A particular image element is identified. A predetermined rule is applied to determine whether a display attribute of the particular image element is unique in an image region. If the display attribute of the particular image element is determined not to be unique in the image region, then display attributes of the other image elements which would have the same attribute as that of the particular image element in the same region are changed.

In yet another embodiment, the display attributes of the other image elements which are found to have the same attribute as that of a selected image element in the same display region will remain unchanged, but the attribute of the selected image element itself will be changed to make itself unique. In any case, the present invention displays an identified image element conspicuously so that user perception time on a screen is advantageously decreased.

DETAILED DESCRIPTION

FIG. 1 illustrates a known computer user interface 100. Specifically, a selectable icon 102 is made conspicuous by having its display attribute changed in some way such as, for example, by adding a color background (shown as a darken background in FIG. 1). Unfortunately, however, it is also shown in FIG. 1 that this attribute is not unique throughout the whole display screen 100. Specifically, element 103 in the background of the same window 111 also has the same display attribute as that of element 112. In addition, elements 104 and 108 in window 112; elements 105 in window 113; element 106 in windows 114 and element 107 on the same display screen 100 in FIG. 1, also share the same display attribute as the currently focused icon 102. Since there are several elements that have the same display attribute on screen 100, it adds time for a user to perceive which icon is the one that is the mostly recently enabled and can be acted upon next.

Figure 2:
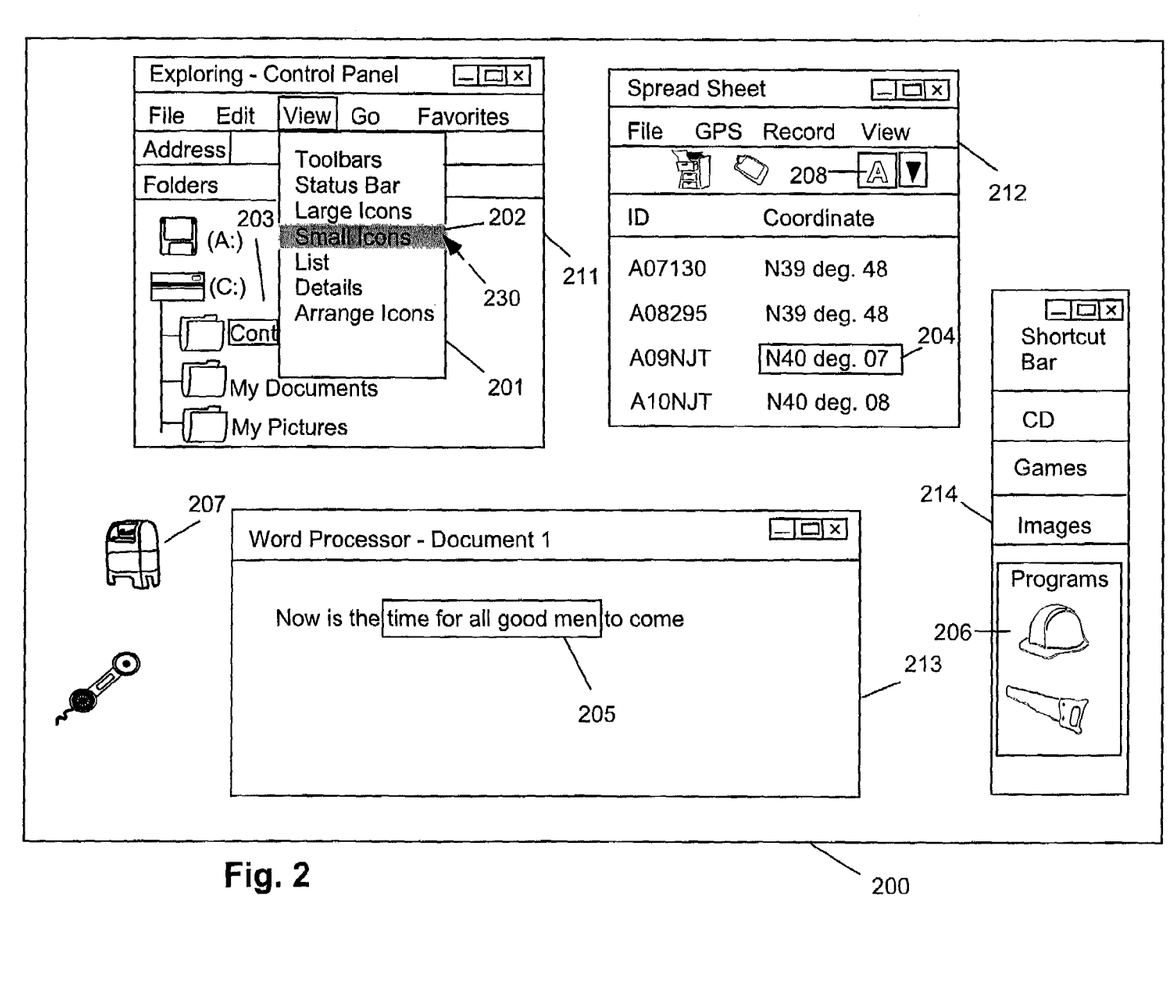
FIG. 2 illustrates an exemplary user interface graphical display according to principles of the present invention.

FIG. 2 shows a first exemplary graphical display screen 200 according to the principles of the present invention. Graphical display screen 200 also has multiple windows 211 to 214, similar to display screen 100 shown in FIG. 1. Graphical display 200 is processed and displayed by an exemplary process according to the principles of the present invention, as shown in FIG. 4.

Figure 4:
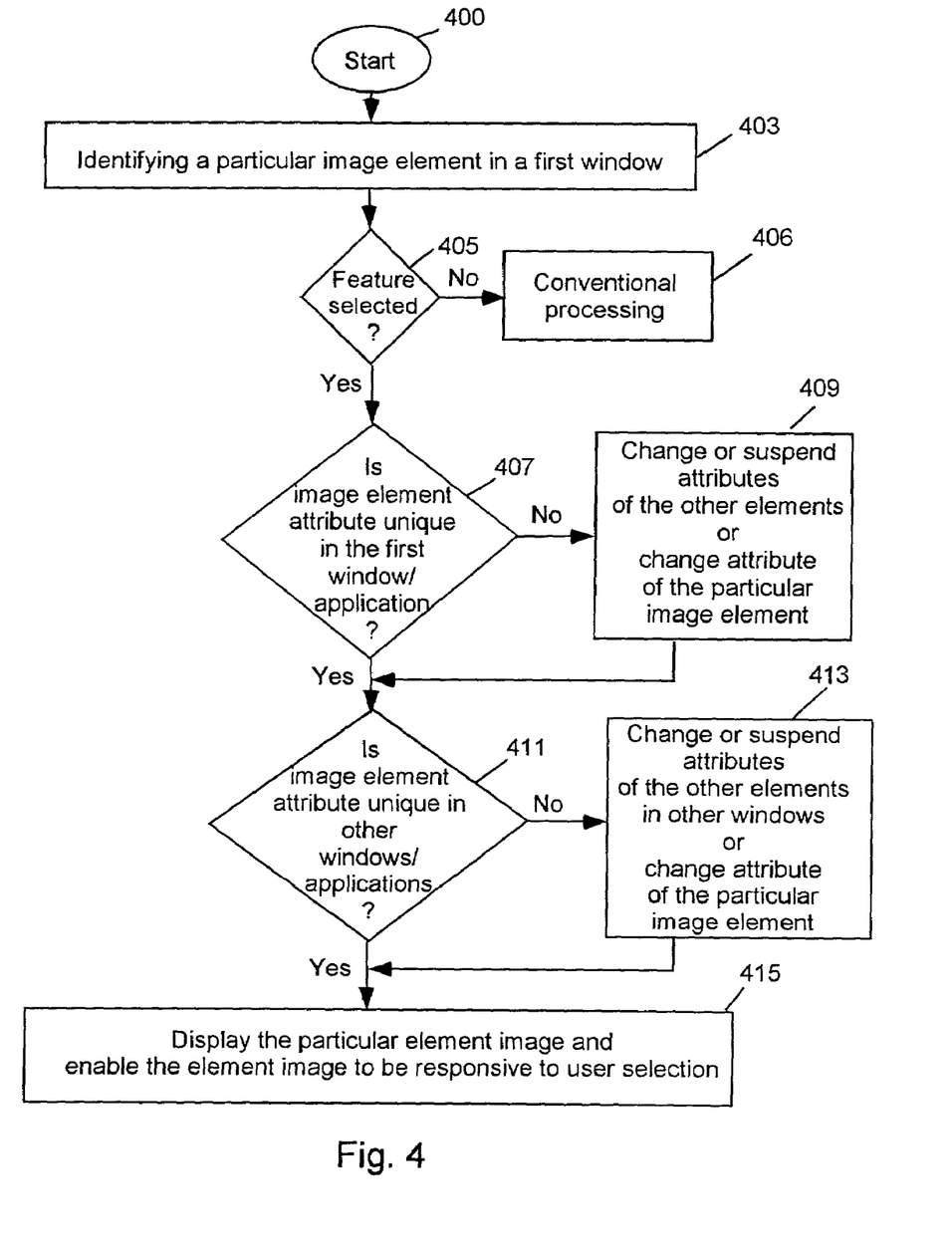
FIG. 4 illustrates an exemplary process according to principles of the present invention.

At step 403 of FIG. 4, a particular image element is first identified to be processed, such as for example, icon 202 in window 211 of FIG. 2. An image element may comprise, but is not limited to, for example, an icon, a user prompt, one or more text characters, one or more symbols, a graphics element, and/or a user selectable image feature such as a window background color selection, etc.

An image element may be identified to be processed at step 403 because for example, it is a command icon that has been focused by a cursor 230 and is enabled for further action by a user, such as, for example, "Small Icons" 202 of FIG. 2. An image element may also be identified to be processed at step 403 because a user has purposely highlighted it in an application such as a word processor. For example, element 205 in the word processor application window 213 of FIG. 2 illustrates this type of image element.

At step 405 of FIG. 4, a determination is then made as to whether a user has previously selected this exemplary feature according to principles of the present invention. If this feature has not been selected, the system would then process and display the identified image element in a conventional matter at step 406. That is, the identified image element will be displayed with a display attribute to highlight it, without regard to display attributes of the other elements on the display screen. The conventional result would be the same as that shown on screen 100 of FIG. 1.

On the other hand, if the exemplary feature has been selected, further processing will be made before the identified element is displayed with a display attribute. A display attribute according to the present invention may be, but is not limited to, for example, a particular image element color, a particular image element shape, a particular image element type of highlighting, a particular image element foreground or background, a particular type of image element shading, a particular image element outline, a particular image element fill pattern, a particular image element size (e.g. length, width, and/or height), a particular image element orientation, a particular image element brightness, a particular image element variation with time (e.g., flicker, motion, motion direction), a grouping of a particular image element, and a particular image element font.

Continuing at step 407 of FIG. 4, a determination is made as to whether the identified image element with its display attribute for making it conspicuous to a user would have a unique display attribute in an associated window or application. At step 409, if it is determined that another element in the selected window has the same display attribute as the identified image element, one of following exemplary alternatives to make the identified image element conspicuous may be employed.

In the first exemplary alternative shown at step 409, display attributes of the other elements in the same window that are found to have the same attribute as the identified element will be changed to another pre-selected attribute. That is, the identified element (e.g., icon 202) will be displayed with the same display attribute as before, but another, new display attribute will be assigned to any of the elements in the same window that would have the same attribute as that of the identified image element. This is illustrated in window 211 of FIG. 2. The "Small Icons" element 202 of FIG. 2 is still shown to have the same display attribute as before as shown in FIG. 1 (i.e., illustrated by having the same darken background). Element 203 in the same window 211, however, has been changed to another display attribute, as illustrated by its un-darken, white background. This allows identified element 202 to be displayed with a unique attribute in window 211 of FIG. 2, according to one aspect of the present invention.

According to another alternative of the present invention at step 409, the system may suspend the substitution of the display attributes for the other elements in the same display region, even though this may make the identified element not unique. This is because the present inventor recognizes that some display attributes may be critical to correctly rendering a display image. This may be the case, for example, if the other elements are part of a highly detailed, mega-pixel image.

The present inventor further recognizes that since there are many ways of changing a display attribute to emphasize an element on a screen, another aspect of the present invention is to allow a system to select another display attribute for the identified image element itself, if a first selection is not unique. Therefore, in another exemplary alternative shown at step 409 of FIG. 4, a new display attribute for the identified element itself will be selectively chosen, before it is displayed, so that changes to the other elements may be avoided.

Figure 3:
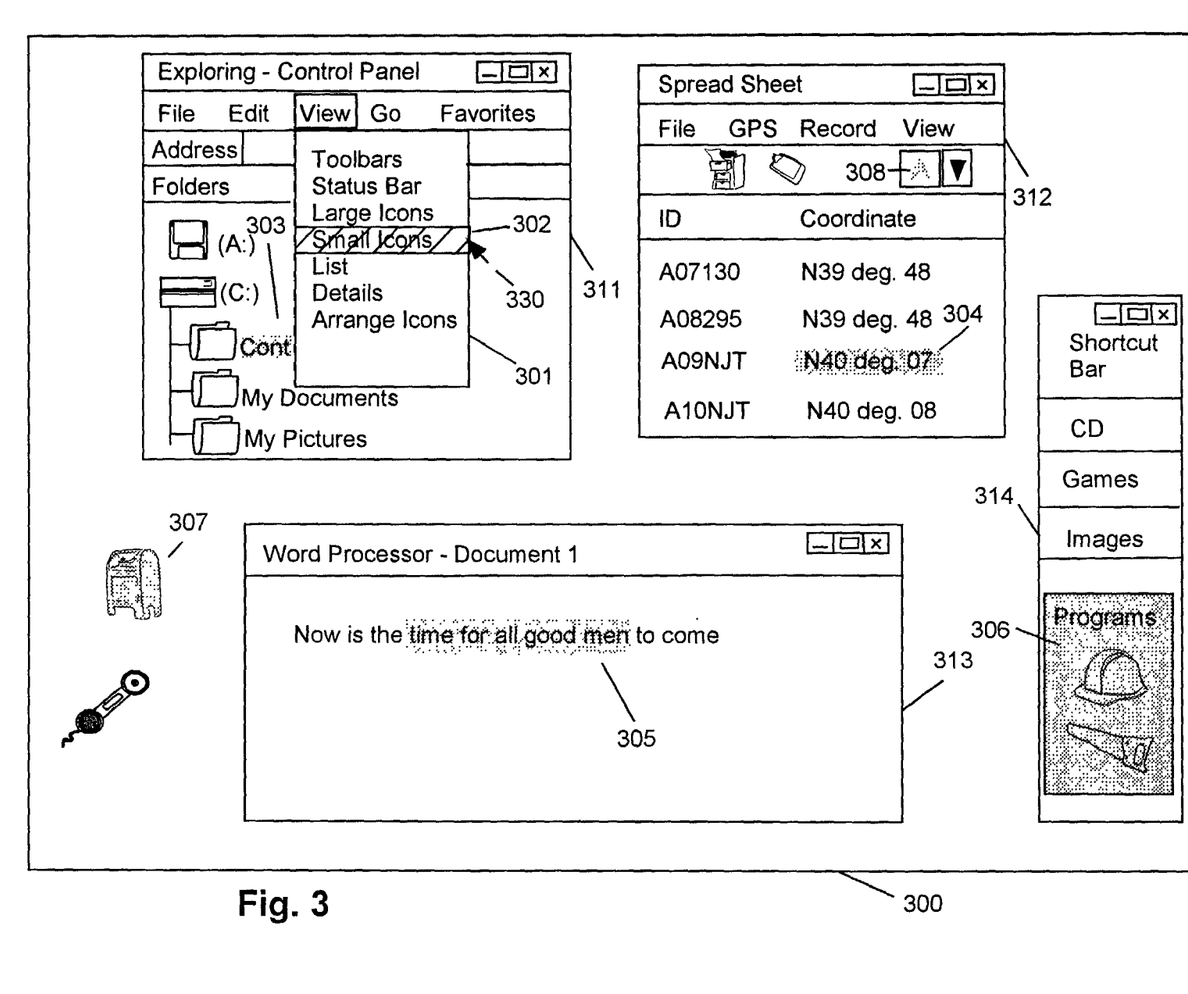
FIG. 3 illustrates another exemplary user interface graphical display according to principles of the present invention.

For example, a display attribute for the identified image element may be selectively chosen from a list of possible display attributes, until a unique one is found. This will ensure that the new display attribute of the particularly identified image element can be displayed conspicuously, without having to change display attributes of the other elements. This alternative process is illustrated in FIG. 3 of the present invention. It is shown in FIG. 3 that display attribute of "Small icons" 302 has changed from that appearing in FIG. 1 to another attribute, as illustrated by a lined background of icon 302 shown in FIG. 3. The display attribute of the other element 303 in the same window 311, however, remains the same as before as shown in FIG. 1.

Continue at step 411 of FIG. 4, once the display attribute of the identified element is made unique in its own window or application, a determination is made to see if the display attribute of the image element is also unique in other windows or applications on the rest of display screen. At step 413, if the determination at step 411 is negative, then one of the previously described exemplary alternatives of making the image element conspicuous as described in step 409, will be expanded to apply to all the other windows on the same display screen.

That is, for example, using a first alternative shown at step 413, the display attributes of other elements in different windows of display screen 200 which would have the same display attribute as that of the particular image element, will be changed to have another display attribute. For example, FIG. 2 shows that elements 204 and 208 in window 212; element 205 in window 213; element 206 in windows 214, and element 207 on the same display screen 200 have now been changed to have another display attribute as illustrated by having a white, un-darken background. The "Small Icons" 202 is therefore made conspicuous on the entire display screen 200, according to the present invention.

In another alternative as shown at step 413, the changes to the other elements in the other windows may be suspended, if it is determined that the image being displayed is of a certain type. The result would then be the same as that displayed in FIG. 1.

In yet another alternative at step 413, the display attribute of the identified image element is changed itself, leaving the attributes of the other elements in the different windows unchanged. This result is illustrated in FIG. 3 which shows that icon 302 now has a different display attribute (shown as having a lined background), while the display attributes of the other elements remain the same. The result still allows a user to easily perceive icon 302 among the various other highlighted elements, as shown in FIG. 3.

Once all the relevant display attributes for various image elements have been processed according to the previously described steps of FIG. 4, they will be ready for display along with the conspicuously identified image element. The identified image element is also enabled to be responsive to a user selection, at step 415.

Figure 5:
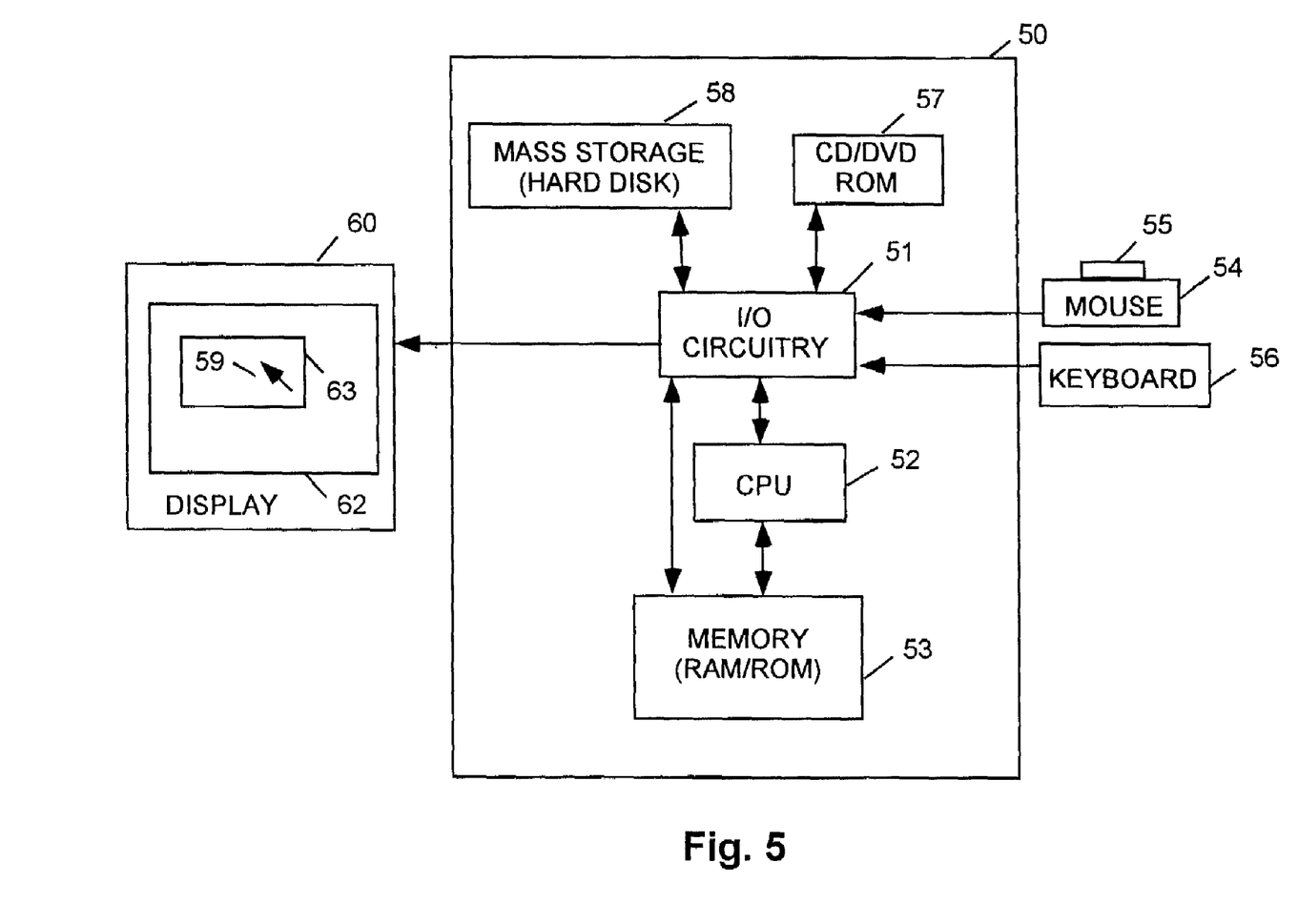
FIG. 5 illustrates an exemplary system capable of practicing the present invention.

FIG. 5 describes an exemplary system for generating a graphical display in accordance with the teachings of the present invention. System 50 may comprise a general purpose computer or a specially constructed computer. A general purpose or specially constructed computer may be used with a program or programs in accordance with the teachings herein. An example of general purpose computer may be a IBM-compatible personal computer, capable of running MS Windows®. An example of a specialized machine may be a patient monitoring system for used in various medical fields.

The display process of the present invention, as shown for example, in FIG. 4, may be implemented using an exemplary system illustrated in FIG. 5. System 50 comprises an input/output (I/O) section 51 which is used to communicate information in an appropriate form to and from other components of system 50. In addition, system 50 comprises a central processing unit (CPU) 52 coupled to I/O section 51 and a memory 53 such as RAM and/or ROM for storing computer programs and other information to be executed. An example of a computer program which may be executed is a process illustrated in FIG. 4 of the present invention.

System 50 includes a display 60, such as, for example, a CRT monitor, a liquid crystal display (LCD), or others It further includes a cursor control 54, such as, for example, a mouse, a track ball, joy stick or other device for selectively positioning a cursor 59 on a display screen 62 of the display 60. Typically, cursor control 54 includes a signal generation means, such as a switch 55 which a user of the computer system may use to generate signals directing the computer to execute certain commands which have been focused or enabled by the cursor control 54. System 50 also includes a keyboard 56 to input data and commands from a user, as is well known in the art.

Also shown in FIG. 5 is a mass storage device 58, such as a hard disk, coupled to I/O circuit 51 to provide additional storage capability for computer 50. In addition, a CD/DVD ROM 57 is further coupled to I/O circuit 50 for additional storage capacity or as another I/O device. It will be appreciated that additional devices (not shown) may be coupled to computer 50 for various purposes, as well known in the art.

As illustrated in FIG. 5, display 60 comprises a display screen 62 in which a window 63 is displayed. An example of a display screen 62 is shown, for example, as display screen 200 of FIG. 2 or screen 300 of FIG. 3. An example of a window 63 is shown, for example, as window 211 of FIG. 2 or window 311 of FIG. 3.

With an embedded or a proprietary system such as a medical patient monitoring system, one exemplary way of implementing the present invention is to have a programming standard agreed to and followed by all programmers writing programs for the same system. Imported applications would need to be modified to conform to this standard. A programmatically enforced method may provide even more benefit in this development environment since considerable verification would be required to ensure all software complies with the unique highlight standard.

With a non-embedded, or non-proprietary system, unique user input focus element may be most effectively enforced at the operating system level. This enforcement may easily be done for user interface appearance and behavior elements since they are determined through the operating system.

It is to be understood that the embodiments and variations shown and described herein are for illustrations only and that various modifications may be implemented by those skilled in the art without departing from the scope of the invention.

What is claimed is:

1. A method for providing a graphical user interface display with a conspicuous image element, comprising the actions of:
    identifying a particular image element;
    comparing a user visible display attribute of said particular image element in a first window in a displayable image with a user visible display attribute of other image elements in said first window and other image elements in any other window concurrently displayed in said displayed image;
    ensuring said particular image element has a unique user visible display attribute absent from said other image elements in said first window and absent from said other image elements in said any other window concurrently displayed in said displayed image; and
    enabling said particular image element to be responsive to user selection.

2. A method according to claim 1, wherein
    said unique user visible display attribute comprises at least one of, (a) a particular image element color, (b) a particular image element shape, (c) a particular image element type of highlighting, (d) a particular image elernent foreground or background, (e) a particular type of image element shading, (f) a particular image element outline, and (g) a particular image element fill pattern.

3. A method according to claim 2, wherein
    said particular image element comprises at least one of, (a) an icon, (b) a user prompt, (c) text, (d) symbols, (e) graphics elements and (f) a user selectable image feature.

4. A method according to claim 1, wherein
said action of comparing includes the steps of,
examining data representative of other image elements, other than said particular image element, to identify other image elements having said unique user visible display attribute, and
in data representative of said identified other image elements, substituting data representing a different attribute for data representing said unique user visible display attribute.

5. A method according to claim 4, including the action of
examining data representative of other image elements in data representative of displayable images received from different applications.

6. A method according to claim 1, wherein
said action of comparing includes a standard constraining image element attributes of displayable image elements to ensure said particular image element is the only image element to have said unique user visible display attribute in a displayed image.

7. A method according to claim 1, wherein
said unique user visible display attribute comprises at least one of, (a) a particular image element size, (b) a particular image element orientation, a l)articular image element brightness, (c) a particular image element variation with time, (d) a grouping of a particular image element, and (e) a particular image element font.

8. A method for providing a graphical user interface display with a conspicuous image element, comprising the actions of:
identifying a particular image element;
determining whether a user visible display attribute of the identified particular image element is unique by comparing the user visible display attribute of the identified particular image element to user visible display attributes of other image elements within the image region and in any other displayed image region; and
if said display attribute of the identified particular image element is not unique in said image region, changing an associated display attribute of another image element in said image region having the same attribute as that of the particular identified image element thereby ensuring said identified particular image element has a unique user visible display attribute absent from said other image elements in said image region and in any other image elements concurrently displayed.

9. A method according to claim 8, further comprising the actions of:
enabling said particular image element to be responsive to user selection.

10. A method according to claim 8, wherein said image region comprises a window.

11. A method according to claim 8, wherein said image region comprising a display screen.

12. A method according to claim 8, wherein
said display attribute comprises at least one of; (a) a particular image element color, (b) a particular image element shape, (c) a particular image element type of highlighting, (d) a particular image element foreground or background, (c) a particular type of image element shading, (f) a particular image element outline, and (g) a particular image element fill pattern.

13. A method according to claim 8, wherein
said particular image element comprises at least one of,
(a) an icon, (b) a user prompt, (c) text, (d) symbols, (e) graphics elements and (t) a user selectable image feature.

14. A method according to claim 8, wherein
said display attribute comprises at least one of, (a) a particular image element size, (b) a particular image element orientation, a particular image element brightness, (c) a particular image element variation with time, (d) a grouping of a particular image element, and (e) a particular image element font.

15. A method for providing a graphical user interface display with a conspicuous image element, comprising the actions of:
identifying a particular image element;
determining whether a display attribute of the identified particular image element is unique in an image region by comparing the user visible display attribute of the identified particular image element to user visible display attributes of other image elements within the image region and in any other displayed image renion; and
if said display attribute of the identified particular image element is not unique in said image region, changing said display attribute of the identified particular image element to a unique display attribute in the image region thereby ensuring the identified particular image element has a unique user visible display attribute absent from other image elements in the image region and in any other image region concurrently displayed.

16. The method according to claim 15, wherein said action of changing step further comprising the action of:
determining said unique display attribute by choosing, in a predetermined way, one attribute from a selected list of attributes to compare with other display attributes of other image elements in said display region.

17. A method according to claim 15, further comprising the action of:
enabling said particular image element to be responsive to user selection.

18. A method according to claim 15, wherein said image region comprises a window.

19. A method according to claim 15, wherein said image region comprises a display screen.

20. A method according to claim 15, wherein
said display attribute comprises at least one of, (a) a particular image element color, (b) a particular image element shape, (c) a particular image element type of highlighting, (d) a particular image element foreground or background, (e) a particular type of image element shading, (f) a particular image element outline, and (g) a particular image element fill pattern.

21. A method according to claim 15, wherein
said particular image element comprises at least one of,
(a) an icon, (b) a user prompt, (c) text, (d) symbols, (e) graphics elements and (f) a user selectable image feature.

22. A method according to claim 15, wherein
said display attribute comprises at least one of, (a) a particular image element size, (b) a particular image element orientation, a particular image element brightness, (c) a particular image element variation with time, (d) a grouping of a particular image element, and (e) a particular image element font.

23. A system for providing a graphical user interface display with a conspicuous image element, comprising:
a user interface device operative to highlight a particular image element; and
a processor for comparing a user visible display attribute of said particular image element in a first window in a displayable image with a user visible display attribute of other image elements in said first window and other image elements in any other window concurrently displayed in said displayed image and ensuring said particular image element has a unique user visible display attribute absent from said other image elements in said first window and absent from said other image elements in said any other window concurrently displayed in said displayed image, so that said particular image element is enabled to be responsive to user selection.

* * * * *